US011993181B2

United States Patent
Epaud et al.

(10) Patent No.: US 11,993,181 B2
(45) Date of Patent: May 28, 2024

(54) VEHICLE SEAT ASSEMBLY

(71) Applicant: FAURECIA Sièges d'Automobile, Nanterre (FR)

(72) Inventors: David Epaud, Lardy (FR); Farouk Bouzid, Bretigny sur Orge (FR); Sylvain Roche, Varennes Changy (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 708 days.

(21) Appl. No.: 17/123,580

(22) Filed: Dec. 16, 2020

(65) Prior Publication Data

US 2021/0178935 A1    Jun. 17, 2021

(30) Foreign Application Priority Data

Dec. 17, 2019   (FR) ...................................... 1914649

(51) Int. Cl.
| | | |
|---|---|---|
| *B60N 2/02* | (2006.01) | |
| *B60N 2/12* | (2006.01) | |
| *B60N 2/30* | (2006.01) | |
| *G01V 11/00* | (2006.01) | |

(52) U.S. Cl.
CPC ............. *B60N 2/0244* (2013.01); *B60N 2/12* (2013.01); *B60N 2/3011* (2013.01); *B60N 2/3065* (2013.01); *G01V 11/00* (2013.01)

(58) Field of Classification Search
CPC ...... B60N 2/0244; B60N 2/12; B60N 2/3011; B60N 2/3065; B60N 2/02246; B60N 2/01583; B60N 2/20; B60N 2/305; G01V 11/00
See application file for complete search history.

(56) References Cited

U.S. PATENT DOCUMENTS

| | | |
|---|---|---|
| 6,290,255 B1 | 9/2001 | Stanley |
| 6,598,900 B2 | 7/2003 | Stanley |
| 7,712,831 B2 | 5/2010 | Abt |
| 2002/0003345 A1 | 1/2002 | Stanley |
| 2009/0072604 A1 | 3/2009 | Browne |

(Continued)

FOREIGN PATENT DOCUMENTS

| | | |
|---|---|---|
| CN | 109835217 A | 6/2019 |
| DE | 102004037914 A1 | 3/2006 |

(Continued)

OTHER PUBLICATIONS

Chinese Office Action for Chinese App. No. 202011403916.3 dated Sep. 16, 2022, 13 pages.

*Primary Examiner* — Ig T An
(74) *Attorney, Agent, or Firm* — Barnes & Thornburg LLP

(57) ABSTRACT

A vehicle seat assembly comprising: a seat with: a seating portion having a front edge and a rear edge, means for connecting the seating portion to the floor of the vehicle, a backrest, rotatable relative to the seating portion about a first transverse axis, a control device comprising a detection means, comprising a signal transmitter and a receiver, and wherein the signal transmitter is configured so that the transmitted signal passes through a determined area for detecting an obstacle near the seat, the transmitter and the receiver being positioned so as to be able to detect an obstacle in the path of the seating portion and/or of the backrest when changing the position of the seating portion and/or of the backrest.

16 Claims, 9 Drawing Sheets

(56) References Cited

U.S. PATENT DOCUMENTS

| | | | |
|---|---|---|---|
| 2009/0146668 A1 | 6/2009 | Wuerstlein | |
| 2016/0280095 A1* | 9/2016 | Frye | B60N 2/0244 |
| 2018/0111511 A1* | 4/2018 | Lota | B60N 2/22 |
| 2018/0126873 A1* | 5/2018 | Behrens | B60N 2/002 |
| 2019/0152346 A1* | 5/2019 | Kim | G08B 21/24 |

FOREIGN PATENT DOCUMENTS

| | | |
|---|---|---|
| DE | 102009053603 A1 | 7/2010 |
| EP | 1870334 A2 | 12/2007 |

\* cited by examiner

VEHICLE SEAT ASSEMBLY

PRIORITY CLAIM

This application claims priority to French Patent Application No. FR1914649, filed Dec. 17, 2019, which is expressly incorporated by reference herein.

BACKGROUND

The present disclosure relates to a seat assembly of a vehicle, and in particular of a motor vehicle.

SUMMARY

According to the present disclosure, a vehicle seat assembly comprises a vehicle seat with a seating portion having a front edge and a rear edge, connecting means for connecting the seating portion to the floor of the vehicle, configured to enable changing the position of the seating portion relative to the floor of the vehicle, and a backrest, integral with the seating portion at the rear edge of the seating portion, rotatable relative to the seating portion about a first transverse axis.

In illustrative embodiments, the vehicle seat assembly further includes a control device comprising a control unit to which is connected at least one detection means, comprising a signal transmitter and a receiver that is configured to receive the signal transmitted by the transmitter.

In illustrative embodiments, the signal transmitter is configured so that the transmitted signal passes through a determined area for detecting an obstacle near the seat.

In illustrative embodiments, the transmitter and the receiver are positioned so as to be able to detect an obstacle in the path of the seating portion and/or of the backrest of the seat when changing the position of the seating portion relative to the floor of the vehicle and/or the position of the backrest relative to the seating portion, the receiver being configured to transmit to the control unit an information signal concerning an obstacle prior to and/or simultaneously with the changing of the position of the seating portion relative to the floor of the vehicle and/or of the position of the backrest relative to the seating portion.

In illustrative embodiments, the signal transmitter and the receiver are configured to transmit, respectively receive, an electromagnetic, optical, or audio signal;

the determined area for detecting an obstacle extends below the seating portion;

the connecting means are configured to enable the rear edge of the seating portion to be brought closer to or further away from the floor of the vehicle, at least in a substantially vertical direction of the seat, by a tilting movement of the seating portion relative to the floor of the vehicle;

the seating portion has at least one side edge connecting the front edge to the rear edge, and the connecting means comprise at least one anchoring means for anchoring the seat to the floor of the vehicle, in particular an upper slide rail, arranged substantially facing the side edge of the seating portion, the determined area for detecting an obstacle extending between the side edge and the anchoring means;

according to a first alternative, the transmitter is integral with the seating portion and the receiver is integral with the anchoring means, and according to a second alternative, the receiver is integral with the seating portion and the transmitter is integral with the anchoring means;

according to the first alternative, the transmitter is positioned at the rear edge of the seating portion, and in particular close to the side edge of the seating portion, and the receiver is positioned on the anchoring means, and according to the second alternative, the receiver is positioned at the rear edge of the seating portion, and in particular close to the side edge of the seating portion, and the transmitter is positioned on the anchoring means;

the determined area for detecting an obstacle extends in front of the backrest and above the seating portion, and:

according to a first alternative, the transmitter is integral with the seating portion and the receiver is integral with the backrest, according to a second alternative, the receiver is integral with the seating portion and the transmitter is integral with the backrest;

the seating portion has at least one side edge connecting the front edge to the rear edge, and the backrest has at least one side wall extending in a substantially vertical plane of the seat, and:

according to the first alternative, the transmitter is integral with the side edge of the seating portion and the receiver is integral with the side wall of the backrest, according to the second alternative, the receiver is integral with the side edge of the seating portion and the transmitter is integral with the side wall of the backrest;

according to a first alternative, the transmitter is integral with the seat and the receiver is separate from the seat, and, according to a second alternative, the receiver is integral with the seat and the transmitter is separate from the seat;

according to the first alternative, the transmitter is integral with the seating portion, the receiver being designed to be placed at the floor of the vehicle, and, according to the second alternative, the receiver is integral with the seating portion, the transmitter being designed to be placed at the floor of the vehicle;

the connecting means comprise at least one anchoring means for anchoring the seating portion of the seat to the floor of the vehicle, the anchoring means having a longitudinal element, configured to pivot relative to the floor of the vehicle about at least a sixth transverse axis, and configured to engage with a locking means integral with the floor of the vehicle in order to ensure its immobilization relative to the floor of the vehicle, and:

according to the first alternative, the transmitter is integral with the longitudinal element of the anchoring means, the receiver being designed to be placed at the locking means integral with the floor of the vehicle, according to the second alternative, the receiver is integral with the longitudinal element of the anchoring means, the transmitter being designed to be placed at the locking means integral with the floor of the vehicle;

the control unit is configured to trigger a warning means upon detection of an obstacle in the determined area by the detection means;

the control unit is configured to actuate a locking means for locking the position of the seating portion relative to the floor of the vehicle or a locking means for locking the position of the backrest relative to the seating portion upon detection of an obstacle in the determined area by the detection means;

the seat further comprises an electric drive means, in particular a motor, configured to drive the movement of the seating portion relative to the floor of the vehicle or to drive the pivoting of the backrest relative to the seating portion about the first transverse axis, and the control unit is configured to:

activate the operation of the drive means if an obstacle is not detected in the determined area by the detection means, block the operation of the drive means if an obstacle is detected in the determined area by the detection means.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
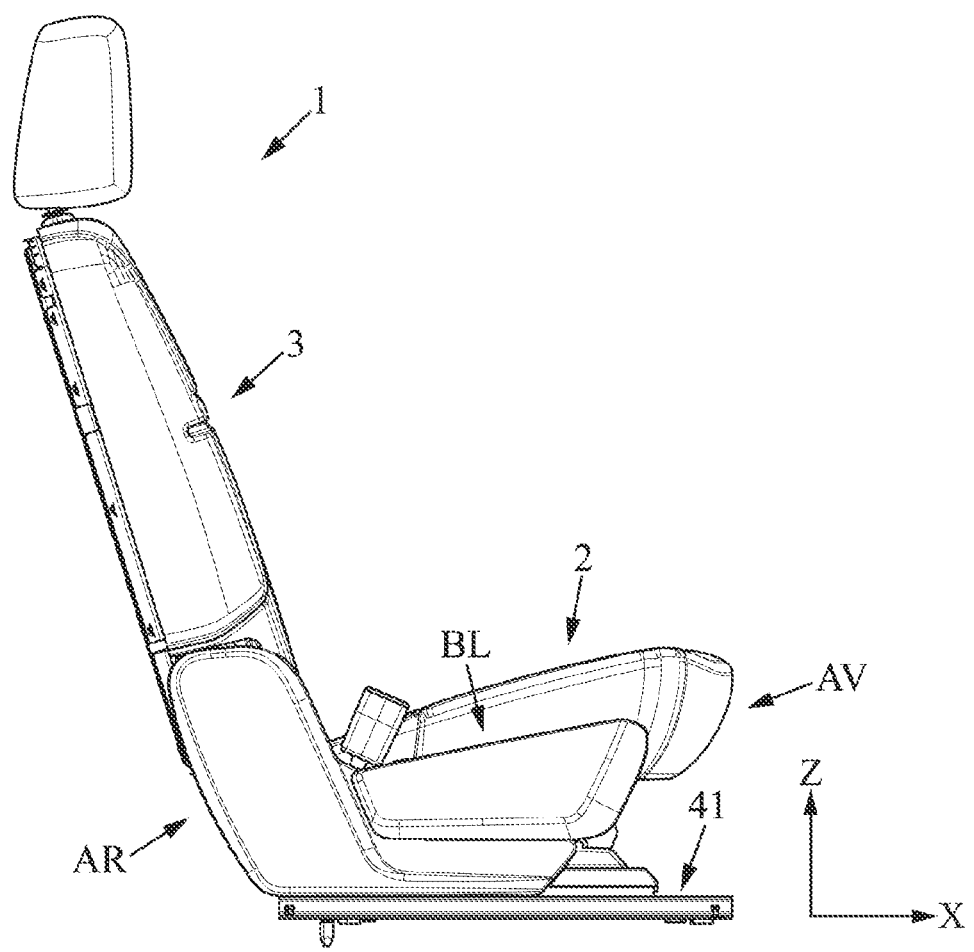
FIG. 1 shows a right side view of a vehicle seat, in the nominal configuration, according to a first embodiment of the present disclosure.

For the most part, the drawings and the following description contain elements that are certain in nature. Therefore not only can they serve to provide a better understanding of the present disclosure, but they also contribute to its definition where appropriate.

Throughout this application, the spatial directions are defined as follows:

the longitudinal direction of the seat corresponds to the direction in which the seat slides relative to the vehicle floor on any slides connecting the seating portion of the seat to the floor of the vehicle, the vertical direction of the seat corresponds to the direction perpendicular to the plane of the floor of the vehicle to which the seat is fixed, also perpendicular to the longitudinal direction of the seat as defined above, and the transverse direction of the seat is the direction perpendicular to the longitudinal direction and vertical direction.

An axis is defined as a straight line in a determined direction, and possibly with a determined orientation. For example, a longitudinal axis is an axis along the longitudinal direction.

Also, front and rear are understood to be according to the longitudinal direction of the seat, with an orientation from the rear edge of the seating portion, where a seat backrest is hinged, towards the front edge of the seating portion.

Similarly, upper/lower and above/below are understood to be according to the vertical direction of the seat, with an orientation from the floor of the vehicle towards the seating portion of the seat.

Finally, throughout this application, substantially longitudinal, transverse, or vertical is understood to mean an orientation relative to the longitudinal direction, vertical direction, or transverse direction that is at an angle of less than 45°, preferably less than 30°, and advantageously may be zero.

The present disclosure relates to a vehicle seat assembly comprising: a vehicle seat 1 with: a seating portion 2 having a front edge AV and a rear edge AR, connecting means 4 for connecting the seating portion 2 to the floor of the vehicle, configured to enable changing the position of the seating portion relative to the floor of the vehicle, a backrest 3, integral with the seating portion 2 at the rear edge AR of the seating portion 2, rotatable relative to the seating portion 2 about a first transverse axis Y1, a control device 5 comprising a control unit 51 to which is connected at least one detection means 52, comprising a signal transmitter 53 and a signal receiver 54 that is configured to receive the signal transmitted by the transmitter 53.

According to the present disclosure, the signal transmitter 53 is configured so that the transmitted signal passes through a determined area ZD for detecting an obstacle O near the seat 1.

According to the present disclosure, the transmitter 53 and the receiver 54 are positioned so as to be able to detect an obstacle O in the path of the seating portion 2 and/or of the backrest 3 of the seat 1 when changing the position of the seating portion 2 relative to the floor of the vehicle and/or the position of the backrest 3 relative to the seating portion 2.

According to the present disclosure, the receiver 54 is configured to transmit to the control unit 51 an information signal concerning an obstacle O prior to and/or simultaneously with the changing of the position of the seating portion 2 relative to the floor of the vehicle and/or the position of the backrest 3 relative to the seating portion 2.

Figure 10:
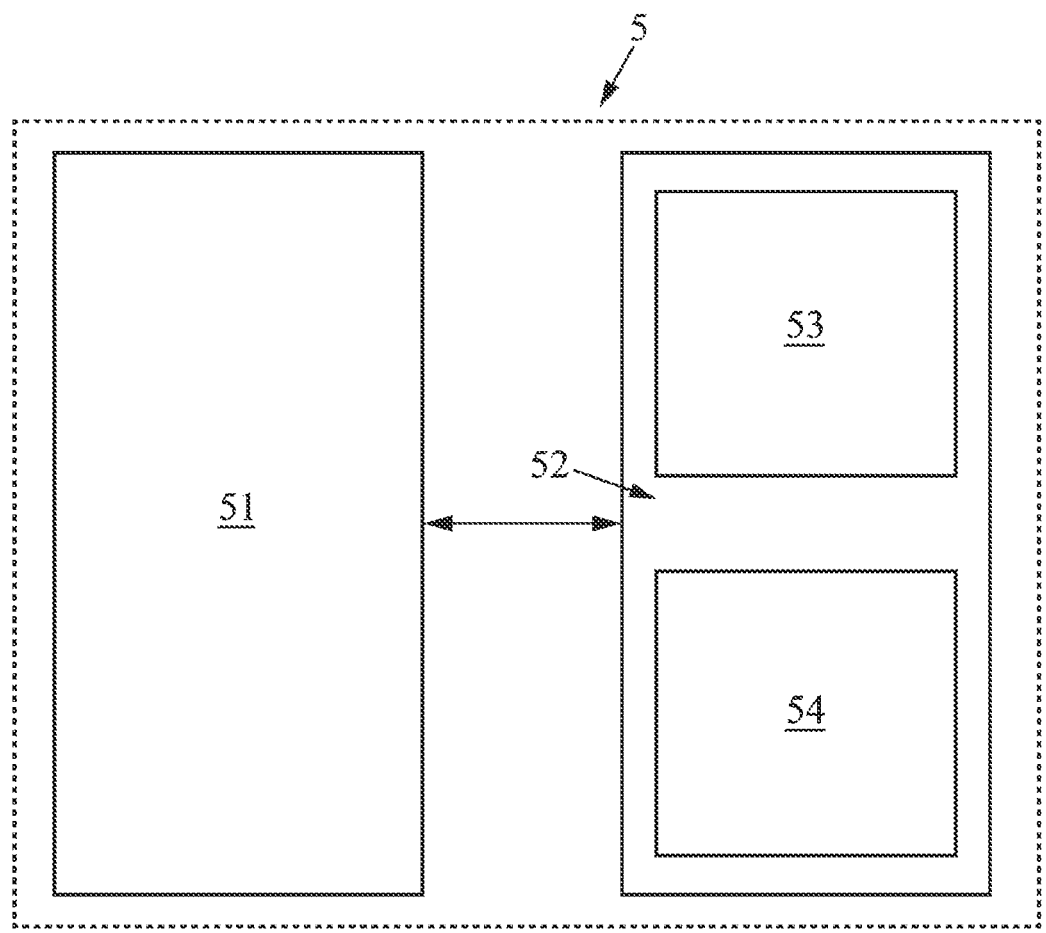
FIG. 10 is a schematic representation of a control device of a vehicle seat according to one embodiment of the present disclosure.

Thus, by means of the control device 5 of the seat 1 according to the present disclosure, schematically represented in the exemplary embodiment of FIG. 10, it is possible, via the detection means 52, to detect or determine the configuration, for example the volume, position, material, of one or more obstacles O in the path of the seating portion 2 or backrest 3 when changing the position of the seating portion 2 relative to the floor of the vehicle and/or the position of the backrest 3 relative to the seating portion 2, which would block the seat from moving from one configuration to another, or which would be caught between elements of the seat 1 or of the vehicle or which could injure an occupant of the vehicle if the obstacle O consists of part of the occupant's body.

Figure 2:
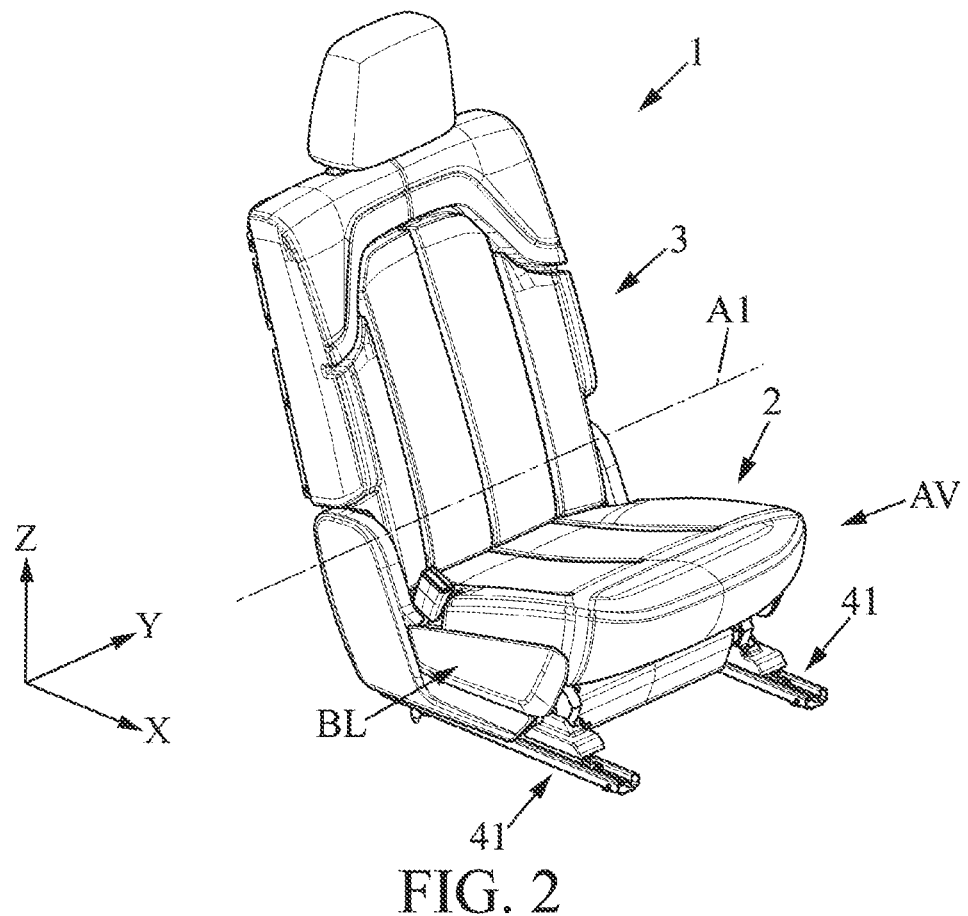
FIG. 2 shows a perspective view of the seat of FIG. 1.
Figure 3:
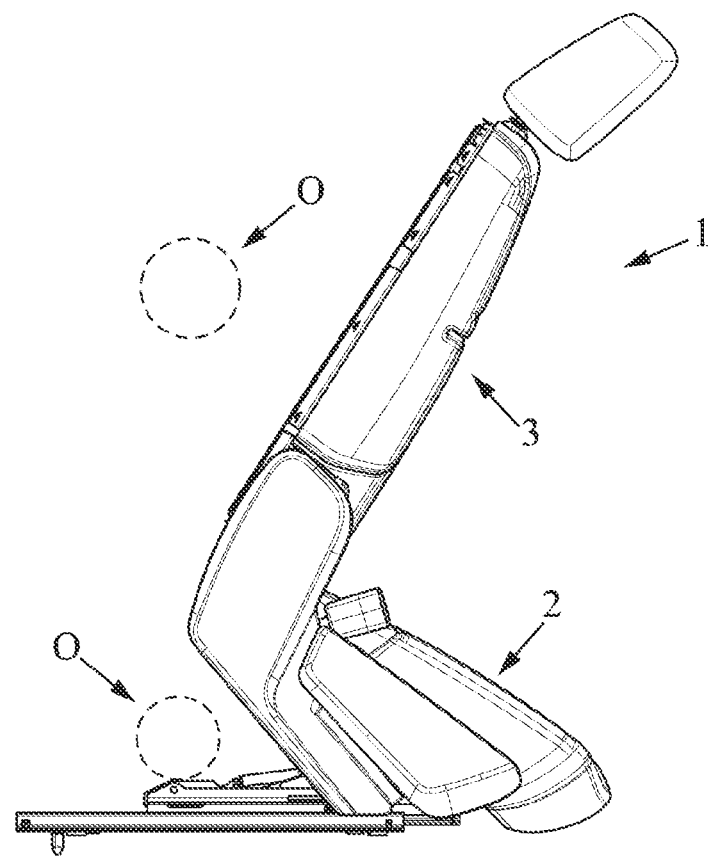
FIG. 3 shows a right side view of the seat of FIG. 1, in the easy entry configuration.
Figure 7:
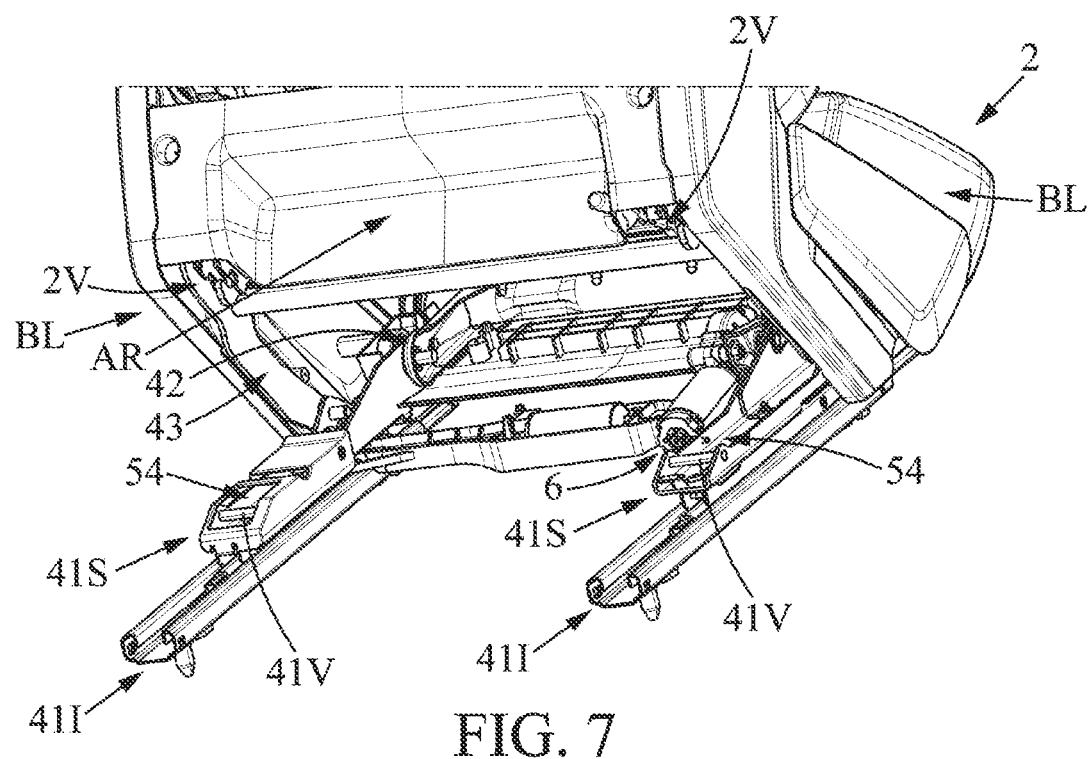
FIG. 7 shows a perspective view of the rear of the seating portion of the seat of FIG. 3.
Figure 8:
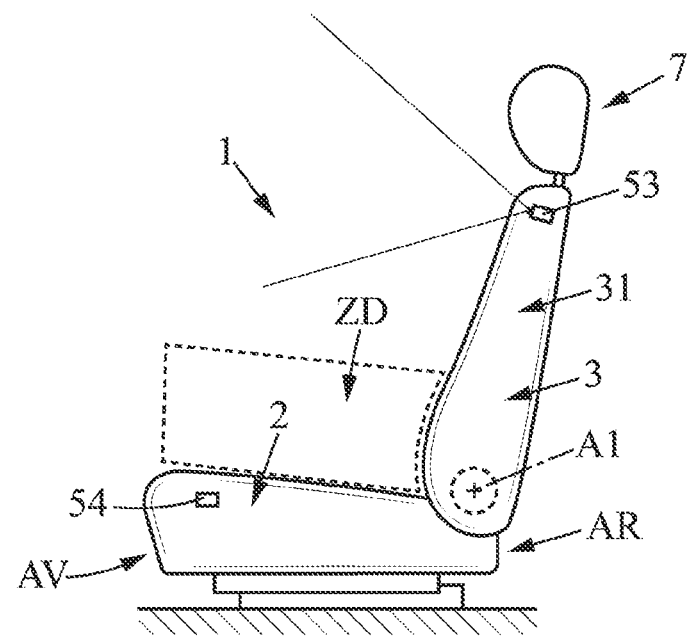
FIG. 8 shows a left side view of a vehicle seat, in the nominal configuration according to a second embodiment of the present disclosure.
Figure 9:
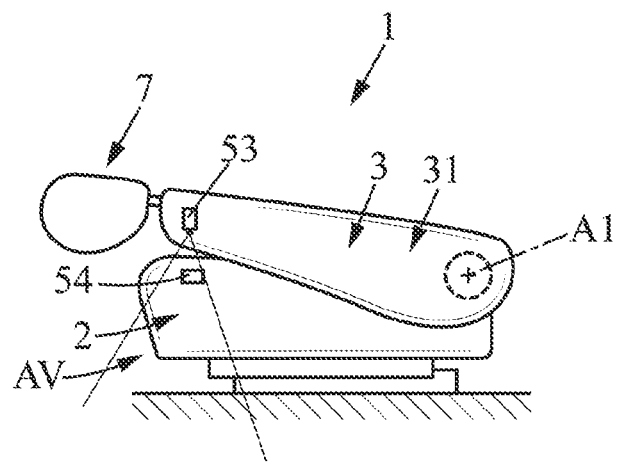
FIG. 9 shows a left side view of a vehicle seat, in the folding configuration of the seat of FIG. 8.
Figure 11:
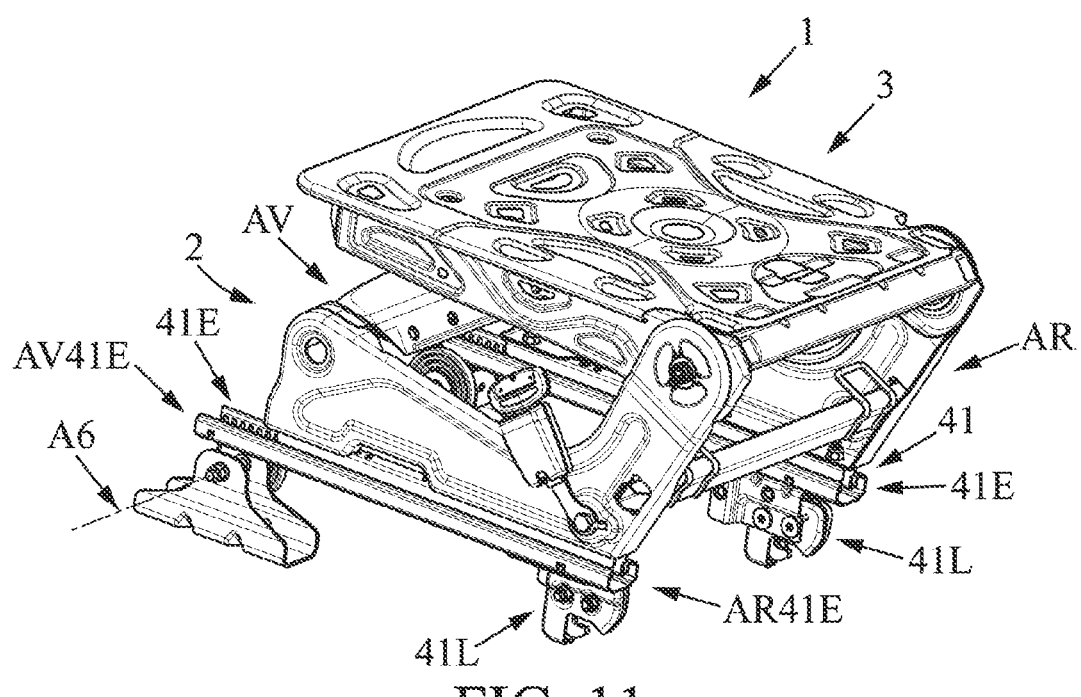
FIG. 11 shows a perspective view of a vehicle seat in the nominal configuration, according to a second embodiment of the present disclosure.
Figure 12:
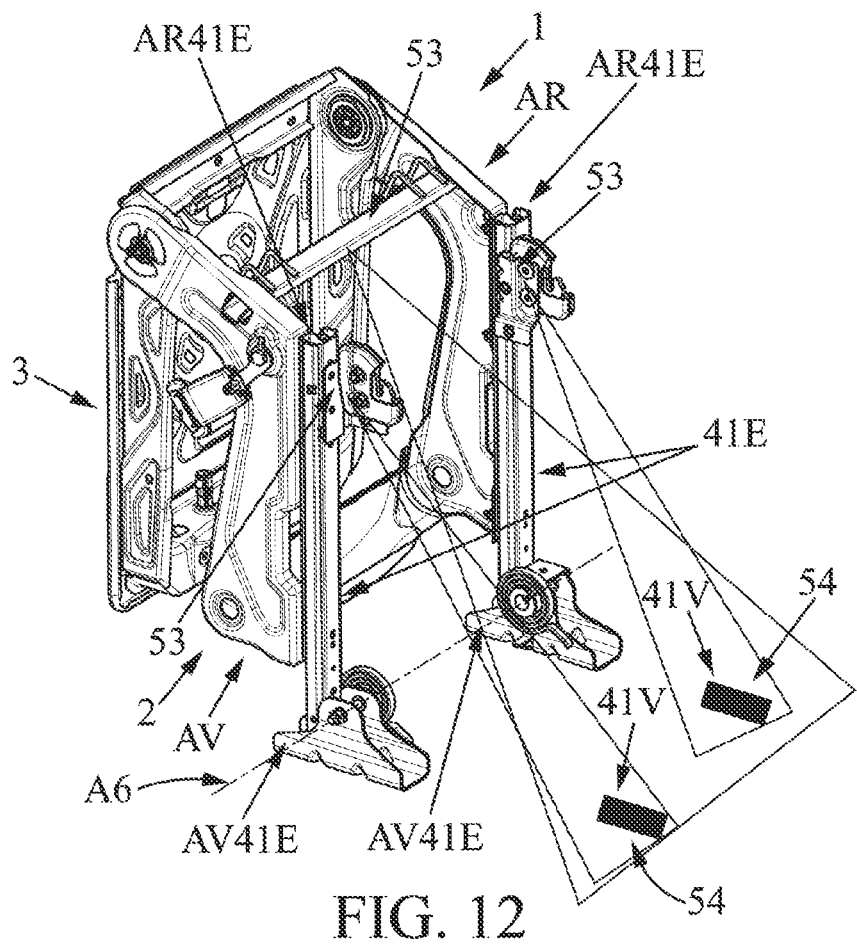
FIG. 12 shows a perspective view of the seat of FIG. 11, in the fold and tumble configuration.

The configurations of the seat 1 described above are represented in the exemplary embodiments of FIGS. 1 to 9, as follows:

the "nominal" configuration is represented in FIGS. 1 and 2, the "easy entry" configuration is represented in the exemplary embodiments of FIGS. 3 to 7, the "folding" configuration is represented in the exemplary embodiments of FIGS. 8 and 9, the "fold and tumble" configuration is represented in the exemplary embodiments of FIGS. 11 and 12.

The control device 5 of the seat 1 according to the present disclosure also makes it possible to initiate an action, and in particular one executed automatically by means of the control unit 51, which would block one of these risks from occurring, for example stopping the movement of the seating portion 2 relative to the floor of the vehicle and/or of the backrest 3 relative to the seating portion 2, or triggering a warning means, for example an alarm, which would indicate to a user of the vehicle the possibility or imminence of such a risk and would allow the user for example to trigger the stopping of the movement of the seating portion 2 relative to the floor of the vehicle and/or of the backrest 3 relative to the seating portion 2.

The detection of an obstacle O by the control device 5 may be a binary detection, meaning that the control unit 51 is configured to be able to conclude only whether an obstacle O is present or absent in the area ZD for detecting an obstacle O, and therefore is in the path of the seating portion 2 or backrest 3 when moving the seating portion 2 relative to the floor of the vehicle or the backrest 3 relative to the seating portion 2.

Additionally or alternatively, the detection may consist of measuring one or more values representative of the configuration of the obstacle O, for example its volume, one or more of its dimensions, its exact position in the vehicle, its type, i.e. whether it is part of the body of an occupant of the vehicle or an object, etc. The control unit 52 may then be configured to compare one or more of the measured values to one or more ranges of predetermined values and to establish that the obstacle O presents a risk only if the measured value(s) are within the predetermined range(s).

The control unit 52 of the control device 5 may comprise one or more circuit boards or a computer. Advantageously, and in order to reduce the cost price of the seat 1 according to the present disclosure, the control unit 52 may be integrated into an on-board computer of a vehicle, not provided specifically for the control device 5.

As can be seen more particularly in the exemplary embodiments of FIGS. 6 to 9, the signal transmitter 53 may be configured so that the transmitted signal has substantially the shape of a cone intersecting with the determined area ZD for detecting an obstacle O.

The transmitter 53 and the receiver 54 may be arranged side by side, and for example maybe integral with the same device, such as a transceiver, the signal emitted by the transmitter 53 reaching the receiver 54 after at least one reflection on a surface and in particular a surface of an obstacle O.

Nevertheless, and advantageously, in order to minimize signal losses between transmitter 53 and receiver 54, these can be separated and arranged substantially opposite one another, as can be seen in the exemplary embodiments of FIGS. 4 to 9, and for example facing one another in the nominal configuration, as can be seen in the exemplary embodiments of FIGS. 1, 2 and 11 and 12, or in the folding configuration, as can be seen in the exemplary embodiments of FIGS. 8 and 9.

The position of the transmitter 53 and receiver 54 may advantageously be determined as a function of the determined area ZD for detecting an obstacle O, and corresponding to the path of the seating portion 2 relative to the floor of the vehicle and/or the path of the backrest 3 relative to the seating portion 2, and/or to minimize the risks of signal interference between the transmitter 53 and the receiver 54.

Also, as can be seen in the exemplary embodiment of FIG. 12, the detection means 52 may comprise a single transmitter 53, alternatively a single receiver 54, associated with at least two receivers 54, alternatively at least two transmitters 53, each of the receivers 54 being configured and positioned so as to be able to receive a signal transmitted by the transmitter 53, alternatively each of the transmitters 53 being configured and positioned so as to be able to transmit a signal received by the receiver 54.

Thus, it is possible with a single transmitter 53, respectively a single receiver 54, to define at least two determined areas for detecting an obstacle O, each determined by the position of the transmitter 53, respectively of the receiver 54.

According to one embodiment, the signal transmitter 53 and the receiver 54 are configured to transmit, respectively receive, an electromagnetic, optical, or audio signal.

The signal may for example be a radar, lidar, infrared, or light signal, or even a laser.

According to one embodiment, the determined area ZD for detecting an obstacle O extends below the seating portion 2.

Indeed, and as can be seen in the exemplary embodiments of FIGS. 3 to 5 and 7, the underside of the seating portion 2, and in particular the area under the rear edge AR of the seating portion 2 and above the floor of the vehicle, constitutes a particularly sensitive area when the seating portion 2 is moving relative to the floor of the vehicle, and in particular when changing from the easy entry configuration to the nominal or folding configuration or else when changing from the fold and tumble configuration to the nominal or folding configuration, because, if an occupant of the vehicle is in a seat behind the seat 1 according to the present disclosure, there is a good chance that the user's feet are located under the seating portion 2 of the seat 1 and in particular under the rear edge AR of the seating portion 2 and that they will come into contact with the seating portion 2 during its movement relative to the floor of the vehicle, blocking it or even running the risk of feet being caught between the seating portion 2 and the floor of the vehicle, which could injure the user.

In particular, according to one embodiment, the connecting means 4 are configured to enable the rear edge AR of the seating portion to be brought closer to or further away from the floor of the vehicle, at least in a substantially vertical direction Z of the seat 1, by a tilting movement of the seating portion 2 relative to the floor of the vehicle.

The connecting means 4 are then configured to allow switching from the nominal or folding configuration to the easy entry configuration or to the fold and tumble configuration, and vice versa, by a simple tilting movement.

Tilting movement of the seating portion 2 relative to the floor of the vehicle is understood to mean a movement of the seating portion 2 relative to the floor of the vehicle comprising at least one rotation of the seating portion 2 relative to the floor of the vehicle about a transverse axis of the seat 1. Advantageously, this movement may be a combination of several rotational movements about different transverse axes of rotation of the seat 1.

However, the switching from the easy entry configuration or from the fold and tumble configuration to the nominal configuration or to the folding configuration by a tilting movement can prove to be particularly dangerous for a user behind the seat 1 executing such a tilting movement, when the user's feet are positioned under the seating portion 2 of the seat 1 and could become caught between the seating portion 2 and the floor of the vehicle, and it is therefore particularly advantageous to be able to detect the presence of a user's feet under the seat 1, prior to or simultaneously with the tilting movement of the seating portion 2 relative to the floor of the vehicle, by means of the control device 5 of the seat 1 according to the present disclosure.

Figure 4:
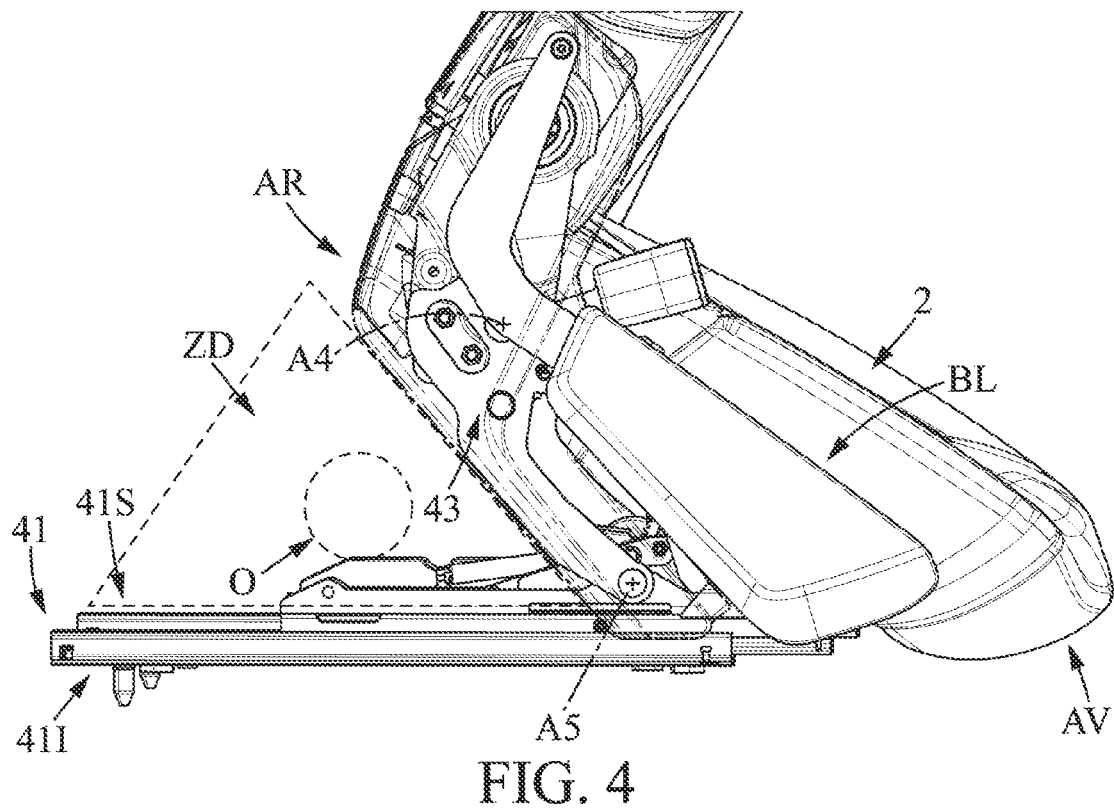
FIG. 4 shows an enlarged view of the seating portion of the seat as represented in FIG. 3.
Figure 5:
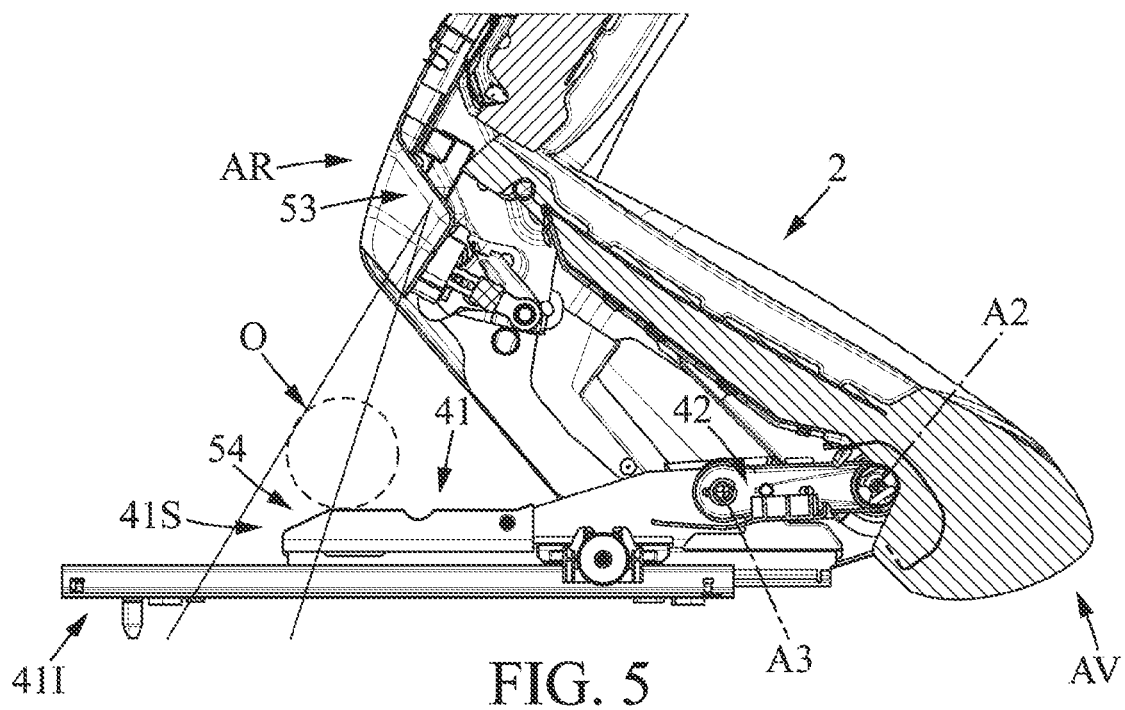
FIG. 5 shows a sectional view along line V-V in FIG. 6, of the enlargement of FIG. 4.
Figure 6:
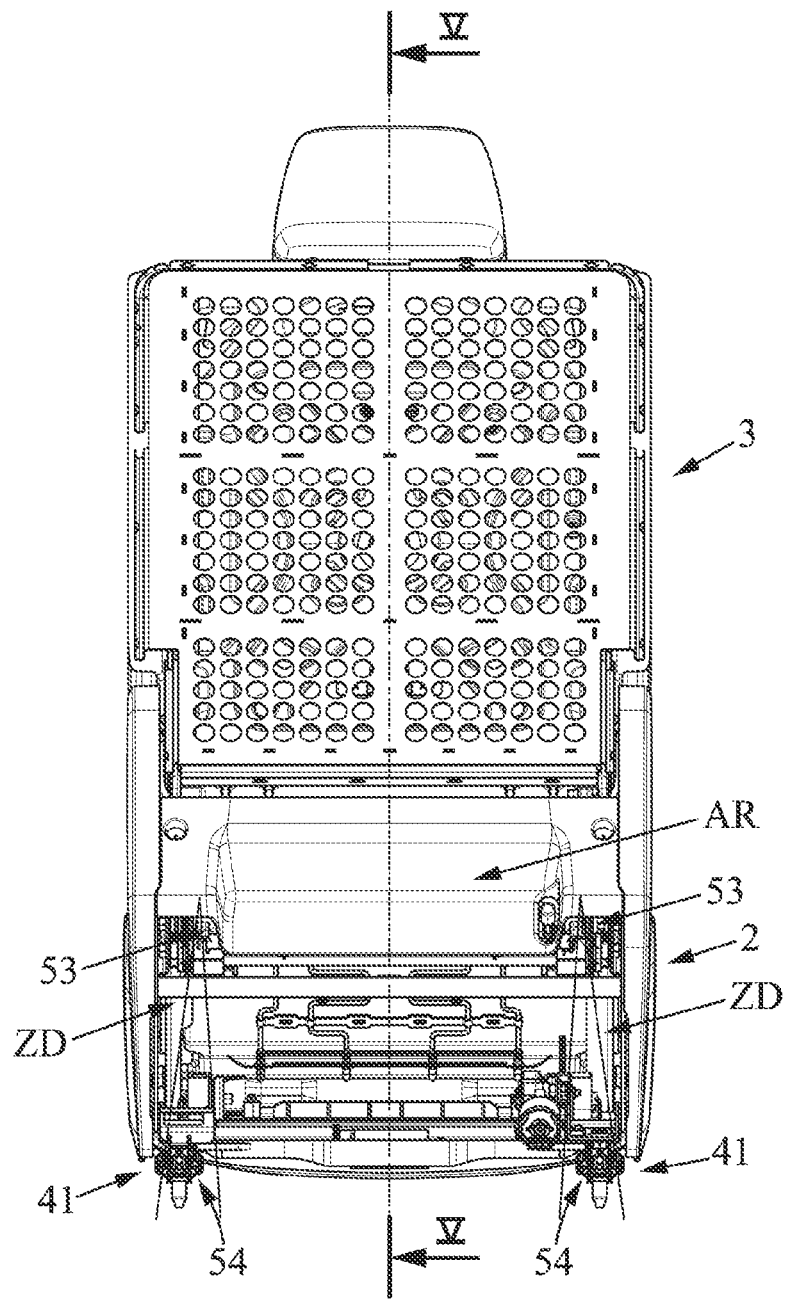
FIG. 6 shows a rear view of the seat of FIG. 3.

As can be seen more particularly in the embodiments of FIGS. 4, 5, and 7, the connecting means 4 may comprise at least a first and a second connecting rod 42, 43, in which:

the first connecting rod 42 is mounted so as to pivot relative to the seating portion 2 about a second transverse axis A2, near the front edge AV of the seating portion 2, the first connecting rod 42 is moreover configured to be mounted so as to pivot relative to the floor of a vehicle about a third transverse axis A3, the second connecting rod 43 is mounted so as to pivot relative to the seating portion 2 about a fourth transverse axis A4, the second connecting rod 43 is moreover configured to be mounted so as to pivot relative to the floor of the vehicle about a fifth transverse axis A5, the at least first and second connecting rods 42; 43 being configured to allow a rear edge AR of the seating portion 21 to be moved closer to or further away from the floor of the vehicle by the tilting movement of the seating portion 2 relative to the floor of the vehicle.

Such a design of the connecting means 4 makes it possible to ensure, with simple kinematics, the switching from the nominal or folding configuration to the easy entry or fold and tumble configuration, and vice versa, by a simple tilting movement of the seating portion 2 relative to the floor of the vehicle. Such kinematics also make it possible to maximize the space freed up behind the seat 1 after switching to the easy entry or fold and tumble configuration, and by limiting the forward movement, in a substantially longitudinal direction X of the seat 1, of the seating portion 2 relative to the floor of the vehicle. The obtained easy entry or fold and tumble configuration facilitates, for example, the passage of a user or of an object behind the seat 1.

Additionally or alternatively, the connecting means 4 may also be configured to allow the seating portion 2 to be raised relative to the floor of the vehicle, in other words to bring the seating portion 2 closer to or further away from the floor of the vehicle by a displacement movement in a substantially vertical direction Z of the seat 1 via a translational movement of the seating portion 2 relative to the floor of the vehicle in the substantially vertical direction Z of the seat 1, during which the seating portion 2 maintains a substantially fixed orientation relative to the floor of the vehicle, and in particular substantially parallel.

According to one embodiment:

the seating portion 2 has at least one side edge BL connecting the front edge AV to the rear edge AR, the connecting means 4 comprise at least one anchoring means 41 for anchoring the seat 1 to the floor of the vehicle, in particular a slide 41, arranged substantially facing the side edge BL of the seating portion 2.

The determined area ZD for detecting an obstacle O may then extend between the side edge BL and the anchoring means 41, and in particular to the rear edge AR of the seating portion 2.

The slide 41 may comprise an upper slide rail 41S and a lower rail 41I slidingly receiving the upper rail 41S, the slide 41 being provided to guide the seat 1 while sliding relative to the floor of the vehicle, in a substantially longitudinal direction X of the seat 1.

Advantageously, two slides 41 are provided, in particular substantially identical, arranged substantially parallel with one on either side of the seat 1, for example below each of the two side edges BL of the seating portion 2.

As can be seen more particularly in the embodiments of FIGS. 4, 5, and 7, the area between the side edge BL of the seating portion 2 and the slide 41, and in particular the upper rail 41S of the slide 41, is an area with a high risk of catching on an obstacle O when the seating portion 2 is moving relative to the floor of the vehicle, and in particular when switching from the easy entry or fold and tumble configuration to the nominal or folding configuration by a tilting movement of the seating portion 2 relative to the floor of the vehicle, because, as can be seen in the embodiments of FIGS. 1 and 2, the space between the side edge BL of the seating portion 2 and the slide 41, and in particular the upper rail 41S of the slide 41, is small or even non-existent when the seat is in the nominal configuration or folding configuration.

The determined area ZD for detecting an obstacle O may be limited, in the transverse direction Y, to the area extending between the side edge BL of the seating portion 2 and the anchoring means 41, and particularly in the case where the distance between the rear edge AR of the seating portion 2 and the floor of the vehicle, in the nominal configuration or in the folding configuration of the seat 1, along the vertical direction Z of the seat 1, is sufficient to accommodate the feet of a user located behind the seat 1 with no risk of the feet being caught between the rear edge AR of the seating portion 2 and the floor of the vehicle.

According to one embodiment:

according to a first alternative, the transmitter 53 is integral with the seating portion 2 and the receiver 54 is integral with the anchoring means 41, according to a second alternative, the receiver 54 is integral with the seating portion 2 and the transmitter 53 is integral with the anchoring means 41.

In particular, and as can be seen in the embodiments of FIGS. 1 to 7:

according to the first alternative, the transmitter 53 is positioned at the rear edge AR of the seating portion 2, and in particular close to the side edge BL of the seating portion, and the receiver 54 is positioned on the anchoring means 41, and preferably on the upper rail 41S of the slide 41, according to the second alternative, the receiver 54 is positioned at the rear edge AR of the seating portion 2, and in particular close to the side edge BL of the seating portion, and the transmitter 53 is positioned on the anchoring means 41, and preferably on the upper rail 41S of the slide 41.

In particular, and as can be seen more particularly in the exemplary embodiment of FIG. 7, the receiver 54, alternatively the transmitter 53, may be placed at a locking means 41V integral with the upper rail 41S of the slide 41, and advantageously so as to be able to detect an obstacle O present near the locking means 41V, which would block the operation of such locking means 41V.

As can also be seen in the exemplary embodiment of FIG. 7, such a locking means 41V is provided in order to engage with a complementary locking means 2V integral with the seating portion 2, advantageously positioned at the rear edge AR of the seating portion 2, and also close to the side edge BL of the seating portion 2, and in particular near which the transmitter 53, alternatively the receiver 54, is placed.

The engagement of the locking means 41V and the complementary locking means 2V makes it possible to lock the position of the seating portion 2 relative to the floor of the vehicle, for example in the nominal configuration or in the folding configuration, and block the movement of the seating portion 2 relative to the floor of the vehicle.

As can be seen in embodiments 3 to 7, and in the case where the seating portion 2 has two substantially parallel side edges BL connecting the front edge AV to the rear edge AR of the seating portion 2, and the connecting means 4 comprise two anchoring means 41, and in particular two substantially parallel slides 41, there may be provided two different determined areas ZD for detecting an obstacle O between each of the side edges BL of the seating portion 2 and each of the anchoring means 41, the control device 5 then comprising two different detection means 52 each for example with a different transmitter 53 and receiver 54, each respectively positioned at a different side edge BL of the seating portion 2 and at a different anchoring means 41, or vice versa.

According to one embodiment, the determined area ZD for detecting an obstacle O extends in front of the backrest 3 and above the seating portion 2, and:
   according to a first alternative, the transmitter 53 is integral with the seating portion 2 and the receiver 54 is integral with the backrest 3,
   according to a second alternative, the receiver 54 is integral with the seating portion 2 and the transmitter 53 is integral with the backrest 3.

Indeed, and as can be seen more particularly in the exemplary embodiments of FIGS. 8 and 9, the top of the seating portion 2, and in particular the area above the seating portion 2 and in front of the backrest 3, constitutes a particularly sensitive area when the backrest 3 is pivoted relative to the seating portion 2 about the first transverse axis A1, and in particular when switching from the nominal configuration or from the easy entry configuration to the folding configuration, and vice versa, because if an occupant of the vehicle is in a seat behind or next to the seat 1 according to the present disclosure, there is a risk that at least one of the occupant's hands will be on the seating portion 2 of the seat 1, and in particular in front of the backrest 3 of the seat 1, and that the hand will come into contact with the backrest 3 when it is pivoted relative to the seating portion 2 about the first transverse axis A1, blocking movement of the backrest or even running the risk of the hand being caught between the seating portion 2 and the backrest 3, which could injure the occupant.

According to one embodiment, and as can be seen for example in the exemplary embodiments of FIGS. 8 and 9:
   the seating portion 2 has at least one side edge BL connecting the front edge AV to the rear edge AR,
   the backrest 3 has at least one side wall 31 extending in a substantially vertical plane of the seat 1, and wherein:
   according to the first alternative, the transmitter 53 is integral with the side edge BL of the seating portion 2 and the receiver 54 is integral with the side wall 31 of the backrest 3,
   according to the second alternative, the receiver 54 is integral with the side edge BL of the seating portion 2 and the transmitter 53 is integral with the side wall 31 of the backrest 3.

This arrangement of the present disclosure allows the detection of an obstacle O in the determined area ZD between the front of the backrest 3 and the top of the seating portion 2, and while positioning the transmitter 53 and the receiver 54 without inconveniencing a user present on the seat 1.

As can be seen in the embodiments of exemplary FIGS. 8 and 9, the transmitter 53, alternatively the receiver 54, may be positioned in the upper portion of the side wall 31 of the backrest 3, in other words near a headrest 7 of the seat 1.

Similarly, the receiver 54, alternatively the transmitter 53, may be positioned in the front part of the seating portion 2, in other words near the front edge AV of the seating portion 2.

In the case where the seating portion 2 has two substantially parallel side edges BL connecting the front edge AV to the rear edge AR of the seating portion 2, and the backrest 3 has two side walls 31, also substantially parallel, two different determined areas ZD for detecting an obstacle O may be provided between each of the side edges BL of the seating portion 2 and each of the side walls 31 of the backrest 3, the control device 5 then comprising two different detection means 52 each with a different transmitter 53 and receiver 54, each respectively positioned at a different side edge BL of the seating portion 2 and at a different side wall 31 of the backrest 3.

According to one embodiment:
   according to a first alternative, the transmitter 53 is integral with the seat 1 and the receiver 54 is separate from the seat 1,
   according to a second alternative, the receiver 54 is integral with the seat 1 and the transmitter 53 is separate from the seat 1.

This arrangement of the present disclosure makes it possible not to limit the determined areas ZD for detecting an obstacle O to the volume of the seat 1 and therefore to consider a larger number of determined areas ZD for detecting an obstacle O.

For example, in the case where the determined area ZD for detecting an obstacle O is located below the seating portion 2, it is possible to position the transmitter 53, alternatively the receiver 54, on the seating portion 2 of the seat 1, and in particular close to the rear edge AR of the seating portion 2, and for example, as can be seen in the embodiment of FIG. 12, in a position substantially centered between the two edges BL of the seat 1 along the transverse direction Y of the seat 1, while the receiver 54, alternatively the transmitter 53, may be positioned directly on the floor of the vehicle, for example opposite the transmitter 53, respectively the receiver 54, when the seat 1 is in the nominal configuration.

Also, and depending on the envisaged determined area ZD for detecting an obstacle O, the transmitter 53, alternatively the receiver 54, may be positioned on any part of the vehicle, for example such as a door, or a seat other than the seat 1, located for example behind or next to the seat 1.

As can be seen in the exemplary embodiments of FIGS. 11 and 12, the connecting means 4 may comprise at least one anchoring means 41 for anchoring the seating portion 2 of the seat 1 to the floor of the vehicle, the anchoring means 41 having a longitudinal element 41E, configured to pivot relative to the floor of the vehicle about at least a sixth transverse axis A6, and being configured to engage with a locking means 41L integral with the floor of the vehicle, in order to ensure its immobilization relative to the floor of the vehicle.

The longitudinal element 41E may have a front longitudinal end AV41E and a rear longitudinal end AR41E, it then being possible for the sixth transverse axis to be positioned at the front longitudinal end AV41E, and for the locking means 41L to be configured to engage with the rear longitudinal end AR41E.

Such a configuration of the connecting means 4 allows switching from the nominal or folding configuration to the fold and tumble configuration by a simple tilting movement of the seating portion 2 relative to the floor of the vehicle, with the anchoring means 41 remaining integral with the seating portion in the fold and tumble configuration. The floor of the vehicle, and in particular under the seating portion 2 of the seat 1 and behind the latter, is unencumbered in the fold and tumble configuration, only the locking means 41L, advantageously positioned below the floor level of the vehicle and/or of reduced footprint.

According to one embodiment, and in particular when the connecting means 4 have such a configuration, and as can be seen in the embodiments of FIGS. 11 and 12, in particular in the case where the determined area ZD for detecting an obstacle O extends below the seating portion 2, and where the connecting means 4 are configured to enable the rear edge AR of the seat to be brought closer to or further away from the floor of the vehicle, at least in a substantially vertical direction Z of the seat 1, by a tilting movement of the seating portion 2 relative to the floor of the vehicle:
- according to the first alternative, the transmitter 53 is integral with the seating portion 2, the receiver 54 being designed to be placed at the floor of the vehicle,
- according to the second alternative, the receiver 54 is integral with the seating portion 2, the transmitter 53 being designed to be placed at the floor of the vehicle.

According to one embodiment and as can be seen in the exemplary embodiments of FIGS. 11 and 12, and in particular in the case where the determined area ZD for detecting an obstacle O extends below the seating portion 2, and where the connecting means 4 are configured to enable the rear edge AR of the seating portion to be brought closer to or further away from the floor of the vehicle, at least in a substantially vertical direction Z of the seat 1, by a tilting movement of the seating portion 2 relative to the floor of the vehicle:
- according to the first alternative, the transmitter 53 is integral with the longitudinal element 41L of the anchoring means 41, the receiver 54 being designed to be placed at the locking means 41L integral with the floor of the vehicle,
- according to the second alternative, the receiver 54 is integral with the longitudinal element 41L of the anchoring means 41, the transmitter 53 being designed to be placed at the locking means 41L integral with the floor of the vehicle.

It is thus possible to detect the presence of an obstacle O located under the anchoring means 41, and in particular under the longitudinal element 41E, when switching from the fold and tumble configuration to the nominal configuration or to the folding configuration, which could become caught between the anchoring means 41 and the floor of the vehicle and would block the change of configuration of the seat 1, or could damage it, or even could injure an occupant of the vehicle and in particular an occupant located behind the seat 1, if the obstacle consists of part of the occupant's body, for example a foot.

In the case where the connecting means 4 have two anchoring means 41 and in particular two longitudinal elements 41E, in particular substantially parallel and/or substantially identical, and provided to engage with two separate locking means 41L, two separate determined areas ZD for detecting an obstacle O may be provided between each of the anchoring means 41 and the floor of the vehicle, the control device 5 then comprising for example two different detection means 52 each with a different transmitter 53 and receiver 54, each respectively positioned at a different longitudinal element 41E and at a different locking means 41L.

According to one embodiment, the control unit 51 is configured to trigger a warning means in the event that an obstacle O is detected in the determined area ZD by the detection means 52.

It is thus possible to warn an occupant of the seat of the presence of an obstacle O in the determined area ZD, corresponding to the path of the seating portion 2 or of the backrest 3 when moving the seating portion 2 relative to the floor of the vehicle or when pivoting the backrest 3 relative to the seating portion 2 about the first transverse axis A1, potentially constituting a risk, and allowing the user to stop the tilting movement of the seating portion 2 relative to the floor of the vehicle and/or the pivoting of the backrest 3 relative to the seating portion 2 about the first transverse axis A1, or not to execute them at all.

This arrangement is particularly advantageous in the case where the movement of displacing the seating portion 2 relative to the floor of the vehicle, respectively of pivoting the backrest 3 relative to the seating portion 2 about the first transverse axis A1, is intended to be performed manually by a user.

The warning means may for example be an audible warning means such as an alarm, or a warning means that is visual, haptic, etc.

According to one embodiment, the control unit 51 is configured to actuate a locking means for locking the position of the seating portion 2 relative to the floor of the vehicle or a locking means for locking the position of the backrest 3 relative to the seating portion 2 in the event that an obstacle O is detected in the determined area ZD by the detection means 52.

Thus, in the event that an obstacle O is present in the determined area ZD, corresponding to the path of the seating portion 2 or of the backrest 3 during the movement of the seating portion 2 relative to the floor of the vehicle or the pivoting of the backrest 3 relative to the seating portion 2 about the first transverse axis A1, potentially constituting a risk, it is possible to lock the position of the seating portion 2 relative to the floor of the vehicle or the position of the backrest 3 relative to the seating portion 2, and this blocks the tilting of the seating portion 2 relative to the floor of the vehicle, and therefore blocks the obstacle O from encountering or becoming stuck between the elements of the seat 1.

This arrangement is also particularly advantageous in the case where the movement of displacing the seating portion 2 relative to the floor of the vehicle or of pivoting the backrest 3 relative to the seating portion 2 about the first transverse axis A1 is intended to be performed manually by a user.

The locking means may comprise locking means 41V and complementary locking means 2V or may comprise the locking means 41L described above, and in particular to block the seating portion 2 from moving relative to the floor of the vehicle when the seat 1 is in the nominal configuration or in the folding configuration. The locking means may also be designed specifically to fulfill this function.

According to one embodiment, the seat 1 further comprises an electric drive means 6, in particular a motor 6, configured to drive the tilting of the seating portion 2 relative to the floor of the vehicle or to drive the pivoting of the backrest 3 relative to the seating portion 2 about the first transverse axis A1.

The control unit 51 may then be configured to:
activate the operation of the drive means 6 if an obstacle O is not detected in the determined area ZD by the detection means 52,
block the operation of the drive means 6 if an obstacle O is detected in the determined area ZD by the detection means 52.

Thus the control unit 51 of the control device 5 can then automatically control the stopping of the movement of the seating portion 2 relative to the floor of the vehicle or of the pivoting of the backrest 3 relative to the seating portion 2 about the first transverse axis A1 if an obstacle O is detected in the determined area ZD by means of the detection means 52, which eliminates intervention by a human user and therefore reduces the risk of human error.

The fact that an obstacle is detected is understood to mean that its presence is detected in a binary manner in the case of binary detection, as explained above, or that one or more of its determined characteristic values are within a predetermined range, also as explained above.

The following numbered clauses include embodiments that are contemplated and non-limiting:

Clause 1. A vehicle seat assembly comprising:
a vehicle seat (1) with:
a seating portion (2) having a front edge (AV) and a rear edge (AR),
connecting means (4) for connecting the seating portion (2) to the floor of the vehicle, configured to enable changing the position of the seating portion (2) relative to the floor of the vehicle,
a backrest (3), integral with the seating portion (2) at the rear edge (AR) of the seating portion (2), rotatable relative to the seating portion (2) about a first transverse axis (A1),
a control device (5) comprising a control unit (51) to which is connected at least one detection means (52), comprising a signal transmitter (53) and a receiver (54) that is configured to receive the signal transmitted by the transmitter (53),
and wherein the signal transmitter (53) is configured so that the transmitted signal passes through a determined area (ZD) for detecting an obstacle (O) near the seat (1),
the transmitter (53) and the receiver (54) being positioned so as to be able to detect an obstacle (O) in the path of the seating portion (2) and/or of the backrest (3) of the seat (1) when changing the position of the seating portion (2) relative to the floor of the vehicle and/or the position of the backrest (3) relative to the seating portion (2), the receiver (54) being configured to transmit to the control unit (51) an information signal concerning an obstacle (O) prior to and/or simultaneously with the changing of the position of the seating portion (2) relative to the floor of the vehicle and/or of the position of the backrest (3) relative to the seating portion (2).

Clause 2. Seat assembly according to clause 1, wherein the signal transmitter (53) and the receiver (54) are configured to transmit, respectively receive, an electromagnetic, optical, or audio signal.

Clause 3. Seat assembly according to one of clauses 1 or 2, wherein the determined area (ZD) for detecting an obstacle (O) extends below the seating portion (2).

Clause 4. Seat assembly according to clause 3, wherein the connecting means (4) are configured to enable the rear edge (AR) of the seating portion to be brought closer to or further away from the floor of the vehicle, at least in a substantially vertical direction (Z) of the seat (1), by a tilting movement of the seating portion (2) relative to the floor of the vehicle.

Clause 5. Seat assembly according to clause 4, wherein:
the seating portion (2) has at least one side edge (BL) connecting the front edge (AV) to the rear edge (AR),
the connecting means (4) comprise at least one anchoring means (41) for anchoring the seating portion (2) of the seat (1) to the floor of the vehicle, in particular an upper slide rail (41S), arranged substantially facing the side edge (BL) of the seating portion (2),
and wherein the determined area (ZD) for detecting an obstacle (O) extends between the side edge (BL) and the anchoring means (41).

Clause 6. Seat assembly according to clause 5, wherein:
according to a first alternative, the transmitter (53) is integral with the seating portion (2) and the receiver (54) is integral with the anchoring means (41),
according to a second alternative, the receiver (54) is integral with the seating portion (2) and the transmitter (53) is integral with the anchoring means (41).

Clause 7. Seat assembly according to clause 6, wherein:
according to the first alternative, the transmitter (53) is positioned at the rear edge (AR) of the seating portion (2), and in particular close to the side edge (BL) of the seating portion, and the receiver (54) is positioned on the anchoring means (41),
according to the second alternative, the receiver (54) is positioned at the rear edge (AR) of the seating portion (2), and in particular close to the side edge (BL) of the seating portion, and the transmitter (53) is positioned on the anchoring means (41).

Clause 8. Seat assembly according to one of clauses 1 to 7, wherein the determined area (ZD) for detecting an obstacle (O) extends in front of the backrest (3) and above the seating portion (2).

Clause 9. Seat assembly according to clause 8, wherein:
according to a first alternative, the transmitter (53) is integral with the seating portion (2) and the receiver (54) is integral with the backrest (3),
according to a second alternative, the receiver (54) is integral with the seating portion (2) and the transmitter (53) is integral with the backrest (3).

Clause 10. Seat assembly according to clause 9, wherein:
the seating portion (2) has at least one side edge (BL) connecting the front edge (AV) to the rear edge (AR),
the backrest (3) has at least one side wall (31) extending in a substantially vertical plane of the seat (1), and wherein:
according to the first alternative, the transmitter (53) is integral with the side edge (BL) of the seating portion (2) and the receiver (54) is integral with the side wall (31) of the backrest (3),
according to the second alternative, the receiver (54) is integral with the side edge (BL) of the seating portion (2) and the transmitter (53) is integral with the side wall (31) of the backrest (3).

Clause 11. Seat assembly according to one of clauses 1 to 5 or 8, wherein:
according to a first alternative, the transmitter (53) is integral with the seat (1) and the receiver (54) is separate from the seat (1),
according to a second alternative, the receiver (54) is integral with the seat (1) and the transmitter (53) is separate from the seat (1).

Clause 12. Seat assembly according to clause 11 in combination with clause 4, wherein:
   according to the first alternative, the transmitter (53) is integral with the seating portion (2), the receiver (54) being designed to be placed at the floor of the vehicle,
   according to the second alternative, the receiver (54) is integral with the seating portion (2), the transmitter (53) being designed to be placed at the floor of the vehicle.

Clause 13. Seat assembly according to clause 11 in combination with clause 4 or according to clause 12, wherein:
   the connecting means (4) comprise at least one anchoring means (41) for anchoring the seating portion (2) of the seat (1) to the floor of the vehicle, the anchoring means (41) having a longitudinal element (41L), configured to pivot relative to the floor of the vehicle about at least a sixth transverse axis (A6), and configured to engage with a locking means (41L) integral with the floor of the vehicle in order to ensure its immobilization relative to the floor of the vehicle, and
   according to the first alternative, the transmitter (53) is integral with the longitudinal element (41L) of the anchoring means (41), the receiver (54) being designed to be placed at the locking means (41L) integral with the floor of the vehicle,
   according to the second alternative the receiver (54) is integral with the longitudinal element (41L) of the anchoring means (41), the transmitter (53) being designed to be placed at the locking means (41L) integral with the floor of the vehicle.

Clause 14. Seat assembly according to one of clauses 1 to 13, wherein the control unit (51) is configured to trigger a warning means upon detection of an obstacle (O) in the determined area (ZD) by the detection means (52).

Clause 15. Seat assembly according to one of clauses 1 to 14, wherein the control unit (51) is configured to actuate a locking means for locking the position of the seating portion (2) relative to the floor of the vehicle or a locking means for locking the position of the backrest (3) relative to the seating portion (2) upon detection of an obstacle (O) in the determined area (ZD) by the detection means (52).

Clause 16. Seat assembly according to one of clauses 1 to 15, further comprising an electric drive means (6), in particular a motor (6), configured to drive the movement of the seating portion (2) relative to the floor of the vehicle or to drive the pivoting of the backrest (3) relative to the seating portion (2) about the first transverse axis (A1),
   and wherein the control unit (51) is configured to:
   activate the operation of the drive means (6) if an obstacle (O) is not detected in the determined area (ZD) by the detection means (52),
   block the operation of the drive means (6) if an obstacle (O) is detected in the determined area (ZD) by the detection means (52).

A vehicle seat, and in particular a motor vehicle seat, comprises:
   a seating portion with a front edge and a rear edge,
   connecting means for connecting the seating portion to the floor of the vehicle, configured to enable changing the position of the seating portion relative to the floor of the vehicle,
   a backrest, integral with the seating portion at the rear edge of the seating portion, rotatable relative to the seating portion about a first transverse axis of the seat.

Advantageously, and in order to envisage different configurations for the seat with different positions of the seating portion relative to the floor of the vehicle, corresponding to different uses of the seat, the connecting means may be configured for example to allow moving the seating portion closer to or further away from the floor of the vehicle, and in particular by a translational movement in a substantially vertical direction of the seat, or by a tilting movement of the seating portion relative to the floor of the vehicle.

Also there are various possible configurations for a vehicle seat, depending on the position of the seating portion relative to the floor of the vehicle and/or the position of the backrest relative to the seating portion.

For example, a first configuration called the "nominal" configuration is known, enabling normal use of the seat, where a user is sitting on it with the seating portion extending in a plane substantially parallel to the floor of the vehicle and the backrest in a plane substantially perpendicular to the floor of the vehicle.

For example, a second configuration called the "easy entry" configuration is known, which allows freeing up the space behind the seat, with the seating portion and the backrest tilted forward relative to the nominal configuration, the rear edge of the seating portion being positioned above the front edge such that it is moved further away from the floor of the vehicle.

For example, a third configuration called the "folding" configuration is known, which allows freeing up the space above the seating portion of the seat, the backrest being folded against the seating portion so as to be positioned substantially parallel thereto, the seating portion able to be in a position substantially corresponding to that of the nominal configuration or easy entry configuration.

For example, a fourth configuration called the "fold and tumble" configuration is known, which allows freeing up the space occupied by the seat above the floor of the vehicle, with the backrest folded against the seating portion so as to be substantially parallel thereto, and the seating portion tilted forward relative to the nominal position and extending substantially perpendicularly to the floor of the vehicle, with the rear edge of the seating portion above the front edge.

Advantageously, the seat and in particular the connecting means may be configured so that switching from the nominal configuration or folding configuration to the easy entry configuration or fold and tumble configuration occurs by a simple movement of tilting the seating portion relative to the floor of the vehicle.

Also, the seat, and in particular the backrest and the seating portion, may be configured so that switching from the nominal configuration to the folding configuration or switching from the easy entry configuration to the folding configuration occurs by a pivoting movement of the backrest relative to the seating portion about the first transverse axis.

However, there may be an obstacle, for example part of the body of a user sitting on a seat located behind or next to the seat whose configuration is being changed, positioned in the path of the seating portion or backrest before or during the change of position of the seating portion relative to the floor of the vehicle or of the backrest relative to the seating portion, thus blocking the switch from one configuration to another, or becoming caught between elements of the seat or other elements of the vehicle, which could damage them or could even injure an occupant of the vehicle sitting near the seat if the obstacle consists of part of the occupant's body.

The present disclosure overcome the disadvantages of comparative vehicle seats by providing a vehicle seat that can take different configurations, for example such as the nominal configuration, easy entry configuration, folding configuration, or fold and tumble configuration described above, in a reliable manner with no risk of damage to the seat or other elements of the vehicle or of injuring an occupant of the vehicle.

The present disclosure also provides such a vehicle seat that is of simple design and a low cost price.

A vehicle seat assembly is proposed comprising:
a vehicle seat with:
   a seating portion having a front edge and a rear edge,
   connecting means for connecting the seating portion to the floor of the vehicle, configured to enable changing the position of the seating portion relative to the floor of the vehicle,
   a backrest, integral with the seating portion at the rear edge of the seating portion, rotatable relative to the seating portion about a first transverse axis,
   a control device comprising a control unit to which is connected at least one detection means, comprising a signal transmitter and a receiver that is configured to receive the signal transmitted by the transmitter.

According to the present disclosure, the signal transmitter is configured so that the transmitted signal passes through a determined area for detecting an obstacle near the seat.

According to the present disclosure, the transmitter and the receiver are positioned so as to be able to detect an obstacle in the path of the seating portion and/or of the backrest of the seat when changing the position of the seating portion relative to the floor of the vehicle and/or the position of the backrest relative to the seating portion, the receiver being configured to transmit to the control unit an information signal concerning an obstacle prior to and/or simultaneously with the changing of the position of the seating portion relative to the floor of the vehicle and/or of the position of the backrest relative to the seating portion.

According to optional features of the present disclosure, taken alone or in combination:
   the signal transmitter and the receiver are configured to transmit, respectively receive, an electromagnetic, optical, or audio signal;
   the determined area for detecting an obstacle extends below the seating portion;
   the connecting means are configured to enable the rear edge of the seating portion to be brought closer to or further away from the floor of the vehicle, at least in a substantially vertical direction of the seat, by a tilting movement of the seating portion relative to the floor of the vehicle;
   the seating portion has at least one side edge connecting the front edge to the rear edge, and the connecting means comprise at least one anchoring means for anchoring the seat to the floor of the vehicle, in particular an upper slide rail, arranged substantially facing the side edge of the seating portion, the determined area for detecting an obstacle extending between the side edge and the anchoring means;
   according to a first alternative, the transmitter is integral with the seating portion and the receiver is integral with the anchoring means, and according to a second alternative, the receiver is integral with the seating portion and the transmitter is integral with the anchoring means;
   according to the first alternative, the transmitter is positioned at the rear edge of the seating portion, and in particular close to the side edge of the seating portion, and the receiver is positioned on the anchoring means, and according to the second alternative, the receiver is positioned at the rear edge of the seating portion, and in particular close to the side edge of the seating portion, and the transmitter is positioned on the anchoring means;
   the determined area for detecting an obstacle extends in front of the backrest and above the seating portion, and:
   according to a first alternative, the transmitter is integral with the seating portion and the receiver is integral with the backrest,
   according to a second alternative, the receiver is integral with the seating portion and the transmitter is integral with the backrest;
   the seating portion has at least one side edge connecting the front edge to the rear edge, and the backrest has at least one side wall extending in a substantially vertical plane of the seat, and:
   according to the first alternative, the transmitter is integral with the side edge of the seating portion and the receiver is integral with the side wall of the backrest,
   according to the second alternative, the receiver is integral with the side edge of the seating portion and the transmitter is integral with the side wall of the backrest;
   according to a first alternative, the transmitter is integral with the seat and the receiver is separate from the seat, and, according to a second alternative, the receiver is integral with the seat and the receiver is separate from the seat;
   according to the first alternative, the transmitter is integral with the seating portion, the receiver being designed to be placed at the floor of the vehicle, and, according to the second alternative, the receiver is integral with the seating portion, the transmitter being designed to be placed at the floor of the vehicle;
   the connecting means comprise at least one anchoring means for anchoring the seating portion of the seat to the floor of the vehicle, the anchoring means having a longitudinal element, configured to pivot relative to the floor of the vehicle about at least a sixth transverse axis, and configured to engage with a locking means integral with the floor of the vehicle in order to ensure its immobilization relative to the floor of the vehicle, and:
   according to the first alternative, the transmitter is integral with the longitudinal element of the anchoring means, the receiver being designed to be placed at the locking means integral with the floor of the vehicle,
   according to the second alternative, the receiver is integral with the longitudinal element of the anchoring means, the transmitter being designed to be placed at the locking means integral with the floor of the vehicle;
   the control unit is configured to trigger a warning means upon detection of an obstacle in the determined area by the detection means;
   the control unit is configured to actuate a locking means for locking the position of the seating portion relative to the floor of the vehicle or a locking means for locking the position of the backrest relative to the seating portion upon detection of an obstacle in the determined area by the detection means;
   the seat further comprises an electric drive means, in particular a motor, configured to drive the movement of the seating portion relative to the floor of the vehicle or to drive the pivoting of the backrest relative to the seating portion about the first transverse axis, and the control unit is configured to:
   activate the operation of the drive means if an obstacle is not detected in the determined area by the detection means, block the operation of the drive means if an obstacle is detected in the determined area by the detection means.

Vehicle seat assembly comprising:

a seat (1) with:

a seating portion (2) having a front edge (AV) and a rear edge (AR), means (4) for connecting the seating portion (2) to the floor of the vehicle, a backrest (3), rotatable relative to the seating portion (2) about a first transverse axis (A1), a control device (5) comprising a detection means (52), comprising a signal transmitter (53) and a receiver (54), and wherein the signal transmitter (53) is configured so that the transmitted signal passes through a determined area (ZD) for detecting an obstacle (O) near the seat (1), the transmitter (53) and the receiver (54) being positioned so as to be able to detect an obstacle (O) in the path of the seating portion (2) and/or of the backrest (3) when changing the position of the seating portion (2) and/or of the backrest (3).

The invention claimed is:

1. A vehicle seat assembly comprising:

a vehicle seat with:

a seating portion having a front edge and a rear edge, connecting means for connecting the seating portion to the floor of the vehicle, configured to enable changing the position of the seating portion relative to the floor of the vehicle, a backrest, integral with the seating portion at the rear edge of the seating portion, rotatable relative to the seating portion about a first transverse axis, a control device comprising a control unit to which is connected at least one detection means, comprising a signal transmitter and a receiver that is configured to receive the signal transmitted by the transmitter, and wherein the signal transmitter is configured so that the transmitted signal passes through a determined area for detecting an obstacle near the seat, the transmitter and the receiver are separated and positioned opposite one another so as to be able to detect an obstacle in the path of the seating portion and/or of the backrest of the seat when changing the position of the seating portion relative to the floor of the vehicle and/or the position of the backrest relative to the seating portion, the receiver being configured to transmit to the control unit an information signal concerning an obstacle prior to and/or simultaneously with the changing of the position of the seating portion relative to the floor of the vehicle and/or of the position of the backrest relative to the seating portion, the vehicle seat further comprises an electric drive means, wherein the presence of an obstacle is detected in a binary manner and the control unit is configured to:

activate the operation of the drive means if an obstacle is not detected in said determined area by the detection means, block the operation of the drive means if an obstacle is detected in said determined area by the detection means.

2. The vehicle seat assembly of claim 1, wherein the signal transmitter and the receiver are configured to transmit, respectively receive, an electromagnetic, optical, or audio signal.

3. The vehicle seat assembly of claim 1, wherein the determined area for detecting an obstacle extends below the seating portion.

4. The vehicle seat assembly of claim 3, wherein the connecting means are configured to enable the rear edge of the seating portion to be brought closer to or further away from the floor of the vehicle, at least in a substantially vertical direction of the seat, by a tilting movement of the seating portion relative to the floor of the vehicle.

5. The vehicle seat assembly of claim 4, wherein:

the seating portion has at least one side edge connecting the front edge to the rear edge, the connecting means comprise at least one anchoring means for anchoring the seating portion of the seat to the floor of the vehicle, in particular an upper slide rail, arranged substantially facing the side edge of the seating portion, and wherein the determined area for detecting an obstacle extends between the side edge and the anchoring means.

6. The vehicle seat assembly of claim 5, wherein:

according to a first alternative, the transmitter is integral with the seating portion and the receiver is integral with the anchoring means, according to a second alternative, the receiver is integral with the seating portion and the transmitter is integral with the anchoring means.

7. The vehicle seat assembly of claim 6, wherein:

according to the first alternative, the transmitter is positioned at the rear edge of the seating portion, and in particular close to the side edge of the seating portion, and the receiver is positioned on the anchoring means, according to the second alternative, the receiver is positioned at the rear edge of the seating portion, and in particular close to the side edge of the seating portion, and the transmitter is positioned on the anchoring means.

8. The vehicle seat assembly of claim 1, wherein the determined area for detecting an obstacle extends in front of the backrest and above the seating portion.

9. The vehicle seat assembly of claim 8, wherein:

according to a first alternative, the transmitter is integral with the seating portion and the receiver is integral with the backrest, according to a second alternative, the receiver is integral with the seating portion and the transmitter is integral with the backrest.

10. The vehicle seat assembly of claim 9, wherein:

the seating portion has at least one side edge connecting the front edge to the rear edge, the backrest has at least one side wall extending in a substantially vertical plane of the seat, and wherein:

according to the first alternative, the transmitter is integral with the side edge of the seating portion and the receiver is integral with the side wall of the backrest, according to the second alternative, the receiver is integral with the side edge of the seating portion and the transmitter is integral with the side wall of the backrest.

11. The vehicle seat assembly of claim 1, wherein:

according to a first alternative, the transmitter is integral with the seat and the receiver is separate from the seat, according to a second alternative, the receiver is integral with the seat and the transmitter is separate from the seat.

12. The vehicle seat assembly of claim 4, wherein:

according to a first alternative, the transmitter is integral with the seat and the receiver is separate from the seat, according to a second alternative, the receiver is integral with the seat and the transmitter is separate from the seat and wherein:

according to the first alternative, the transmitter is integral with the seating portion, the receiver being designed to be placed at the floor of the vehicle, according to the second alternative, the receiver is integral with the seating portion, the transmitter being designed to be placed at the floor of the vehicle.

13. The vehicle seat assembly of claim 12, wherein:

the connecting means comprise at least one anchoring means for anchoring the seating portion of the seat to the floor of the vehicle, the anchoring means having a longitudinal element, configured to pivot relative to the floor of the vehicle about at least a sixth transverse axis, and configured to engage with a locking means integral with the floor of the vehicle in order to ensure its immobilization relative to the floor of the vehicle, and according to the first alternative, the transmitter is integral with the longitudinal element of the anchoring means, the receiver being designed to be placed at the locking means integral with the floor of the vehicle, according to the second alternative the receiver is integral with the longitudinal element of the anchoring means, the transmitter being designed to be placed at the locking means integral with the floor of the vehicle.

14. The vehicle seat assembly of claim 1, wherein the control unit is configured to trigger a warning means upon detection of an obstacle in the determined area by the detection means.

15. The vehicle seat assembly of claim 1, wherein the control unit is configured to actuate a locking means for locking the position of the seating portion relative to the floor of the vehicle or a locking means for locking the position of the backrest relative to the seating portion upon detection of an obstacle in the determined area by the detection means.

16. The vehicle seat assembly of claim 1, further comprising a motor, configured to drive the movement of the seating portion relative to the floor of the vehicle or to drive the pivoting of the backrest relative to the seating portion about the first transverse axis.

* * * * *